Patented Dec. 11, 1951

2,577,770

UNITED STATES PATENT OFFICE 2,577,770

ALKYD RESINS

Peter Kass and Zeno W. Wicks, New York, N. Y., assignors to Interchemical Corporation, New York, N. Y., a corporation of Ohio No Drawing. Application August 7, 1946,
Serial No. 688,978

4 Claims. (Cl. 260—22)

Our invention relates to the preparation of new oxygen convertible alkyds and more specifically to the preparation of new and improved drying oils.

Generally, under oxygen convertible alkyds the art understands polyhydric alcohol-polybasic acid esters, which contain, molecularly incorporated, a drying oil component. Such compositions, mainly in the form of polymerization products of glycerol with phthalic acid and drying oil fatty acids, have found extensive employment as printing ink vehicles, as printing pastes for cloth, and as varnishes and vehicles for fast drying paints. However, since high viscosity has been typical of the heretofore produced modified alkyds, thinning or dissolving has been found necessary, in many instances, prior to such uses, and to drive off the solvent afterwards; a procedure which, in the absence of installation for solvent recovery, results in a complete loss of the solvent, may constitute a fire hazard and endanger the health of the operators, in addition to the often encountered difficulty that small amounts of the solvent are retained under a superficially dry film, impairing the adherence of the coating material to the base.

Subsequent attempts of replacing the glycerol component by alcohols of increased functionality, after such alcohols became commercially available, have not resulted in radically different products. Alkyds, having oil fatty acid constituents and made from polyglycols, pentaerythritol, sorbitol, mannitol, or dipentaerythritol as the polyhydric alcohol part and with phthalic, malic, maleic, tartaric, citric, adipic and other acids as the polybasic acid component, have been made and while some were described as being of superior quality in showing faster drying time, increased rate of cure, greater hardness and improved chemical resistance of the film, the viscosity of these latter oxygen convertible alkyds was, generally, of the same order as that of the corresponding glycerol compounds, some were found to be even of solid consistency and all required again the use of solvents.

We now have made the heretofore unexpected discovery that, by employing, at specific proportions, other polyhydroxy compounds of still higher functionality and more complex structure, polymerization products of relatively low viscosity may be obtained; in fact we found, that it is not only possible to produce drying alkyds having viscosity characteristics of the well known drying oils, but that such alkyd oils, within a wide range of viscosity, retain the superior film characteristics which have been typical of oxygen convertible alkyd resins.

It is, therefore, an object of our invention to produce new and improved drying oils.

It is a further object of the invention to employ such new drying oils as 100 percent solids vehicles.

It is still another object to use improved methods in preparing these new drying oils.

Other objects of the invention will in part be obvious and will in part appear hereinafter.

In a co-pending application of one of us, Serial No. 645,017, filed February 1, 1946, now abandoned, the preparation of new, highly complex polyhydroxy compounds has been described and claimed. According to this invention, pentaerythritol may be converted not only into the known di- and tripolymers, which appear as incidental by-products in the synthesis of the mono-compounds, but this tetrahydric alcohol or its lower polymers may be dehydrated to practically any desired degree of polymerization, yielding polyhydroxy compounds of very high functionality.

These polymeric polyhydric alcohols are produced by heating pentaerythritol, or dipentaerythritol, for instance, with an acid dehydration catalyst, preferably with p-toluene sulfonic acid. The degree of polymerization may be regulated by the amount of cleavage water which is allowed to evolve during the process and it was found that by stopping the reaction after separating not more than 50 percent of the theoretically attainable, the product still contains a relatively high number of reactive hydroxy groups.

Being thus provided with polyhydroxy alcohols of a functionality and a molecular size exceeding any previously known related compound, it occurred to us to use these high polymeric polypentaerythritols in the preparation of compositions akin to modified alkyd resins. The proportionate requirements of polybasic acid should be less with an alcohol of increased complexity, without reducing size and complexity of the molecular units of the esterification product to such an extent as to deleteriously influence the characteristics of the film. Since, as a result of a reduction in the relative amount of polybasic acid, more OH-groups of the alcohol molecule should be available for esterification with drying oil fatty acids, we had reasons to expect, as the result of our experiments, compositions of the usual character of alkyd resins, but of improved drying qualities. Instead, we obtained substances having the properties of drying oils.

For most practical purposes it is advisable not to use extremely high polymerized alcohols, but to employ polypentaerythritols having preferably not less than about 25 percent reactive hydroxyl, in view of the higher melting points and decreased solubility of the more complex alcohol polymers. A higher melting point of the alcohol constituent requires a higher esterification temperature, which tends to affect the viscosity of the product in a manner similar to that of "heat-bodying" of an oil, i. e. it causes polymerization through the fatty acid chains. As to practical lower limits in the complexity of polyhydric alcohols, which may be applied in making our alkyd oils, a polypentaerythritol, having an average of not less than seven OH-groups per molecule (or about 38 percent reactive hydroxyl) was found to still be a suitable product. Attempts of producing drying oils of this improved character from alcohols of lower functionality or from alcohols composed of long chain molecules with secondary OH-groups, such as polyglycerol or sorbitol, were unsuccessful.

Best results are obtained in partially esterifying, without the aid of transesterification catalysts, suitable polyhydroxy alcohols with drying oil fatty acids prior to reacting them with a polybasic acid. When the alcohol is esterified simultaneously with both the drying oil fatty acids and the polybasic acid, the end-product is often impaired by large amounts of a heavy sludge which, as we are inclined to think, is due to a preponderance in the reactivity of the polybasic acid over that of the drying oil fatty acids, which causes a more or less complete esterification of part of the polyhydric alcohol with the polybasic acid and prevents, in consequence, a uniform molecular linkage of the drying oil fatty acids.

In order to illustrate the manner in which our invention may be practiced, the following examples are presented, without thereby limiting the scope of the disclosure.

Example I

A mixture of one hundred parts pentaerythritol and 1.6 parts p-toluene-sulfonic acid monohydrate is heated, under rapid agitation, to 190–200° C., and the heating is continued until about 8.5 parts of water have been collected. The reaction mixture is then poured in a tray and allowed to solidify. The solid product, yielding 92 parts, is ground. It has a hydroxyl percentage of about 32.

Example II

Pentaerythritol is dehydrated as in Example I, except that 10.6 parts of water are collected. This product, after having been ground, yields 90 parts, and has a hydroxyl percentage of about 30.

Example III

An approximately 1:1 mixture of penta- and dipentaerythritol is dehydrated as in Example I, 11 parts of water being collected. This product has about 25 percent hydroxyl.

Example IV

Dipentaerythritol is dehydrated as in Example I, 8.5 parts of water being collected. The product has approx. 31 percent hydroxyl.

The foregoing are examples of starting material which we found desirable to use.

Example V

A mixture of 380 parts distilled linseed oil fatty acids, 50 parts phthalic anhydride, and 100 parts polymerized pentaerythritol of Example I is heated to 230° C. and held at this temperature, with stirring under an atmosphere of carbon dioxide, until the acid number is below 15. The resultant product contains a large amount of heavy sludge. After removing the sludge by super-centrifuging, an oil is obtained, having an acid number of 9.5 and a viscosity of 10.5 poises at 25° C. The yield, however, is only 335 parts. This oil is useful as a 100 percent solid vehicle for printing inks.

Example VI

A mixture of 354 parts dehydrated castor oil fatty acids, 100 parts polymerized pentaerythritol of Example II and 15.5 parts of 5% calcium naphthenate is heated to 250° C. and held at this temperature for two hours, with stirring under an atmosphere of carbon dioxide. After cooling to 230° C., and the addition of 39.2 parts phthalic anhydride, the reaction mixture is held at 230° C. for one hour. 3.9 parts of phthalic anhydride are then added to make up for sublimation losses, and the heating is continued for two more hours. The resultant oil contains a considerable amount of practically colloidal material, probably calcium phthalate, which is extremely difficult to remove. The clear product has a viscosity of 120 poises and an acid number of 13.6. The yield is 448 parts.

Example VII

A mixture of 365 parts dehydrated castor oil fatty acids and 100 parts polymerized pentaerythritol of Example IV is heated to 250° C. and held at this temperature for two hours, with stirring under an atmosphere of carbon dioxide. After cooling to 230° C., and the addition of 40.5 parts phthalic anhydride the heating is continued for two hours at 230° C. Having filtered the slightly hazy product, an oil is obtained, of an acid number of 15.5 and a viscosity of 123 poises. This oil is suitable as a component of an emulsifiable paint.

Example VIII

A mixture of 444 parts dehydrated castor oil fatty acids and 100 parts of a polymerized pentaerythritol, having an average about 33 percent reactive hydroxyl, is heated to 250° C., with stirring under carbon dioxide, over a period of four hours and is then held at 250–260° C. for one more hour. After cooling to 220° C. and adding 36.5 parts phthalic anhydride, the reaction mixture is heated to 230° C. and is then held at 230° C. for such a period as to yield an oil of a viscosity of 90 poises and an acid number of 10.3 after cooling and clarifying by filtration. This oil is an excellent vehicle for tin printing inks.

Example IX

A mixture of 500 parts of dehydrated castor oil fatty acids and 100 parts of a crude polypentaerythritol, having approx. 33 percent reactive hydroxyl, is heated to 250–260° C. with stirring under carbon dioxide, for one and a half hours. After cooling to 230° C., 19.5 parts phthalic anhydride are added and the reaction mixture is held at 230° C. for one hour. The product is allowed to cool slowly and is clarified from a slight haze by passing it through a super centrifuge. A very slightly colored oil is obtained, at a yield of 513 parts, which has a viscosity of 18 poises and an acid number of 10.3.

Example X

A mixture of 483 parts soya bean fatty acids and 100 parts of a polypentaerythritol, having approx. 33 percent reactive hydroxyl, is held, with stirring under an atmosphere of carbon dioxide, for two hours at a temperature of 250–260° C. After cooling to 200° C., 21.3 parts phthalic anhydride is added and the temperature raised to 230° C. for 30 minutes, at the end of which time the amount of phthalic anhydride is increased to 22.4 parts. The flux is held at 230° C. for five hours. It yields 530 parts of a light yellow oil of a viscosity of 7 poises and an acid number of 9.3. The oil is useful as a vehicle for paints.

Example XI

A mixture of 435 parts linseed oil fatty acids and 100 parts of a crude polypentaerythritol, having approx. 33 percent reactive hydroxyl, is heated, with stirring under carbon dioxide, for two hours at 250–260° C. After cooling to 230° C. and addition of 42 parts phthalic anhydride, heating at 230° C. is continued until a viscosity of 17 poises is attained. The acid number at this point is 7.6. The oil, yielding 490 parts, is useful as a vehicle for printing inks.

Example XII

A mixture of 500 parts linseed oil fatty acids and 100 parts of a polypentaerythritol, having approx. 33 percent hydroxyl, is heated, with stirring under $CO_2$, for two hours at 250–260° C. After cooling to 230° C., and addition of 26 parts Carbic anhydride (maleic anhydride adduct with cyclopentadiene), heating at 230° C. is continued for three hours. The resultant oil is filtered. It has a viscosity of 16.5 poises and an acid number of 13.5.

Example XIII

A mixture of 384 parts linseed oil fatty acids and 100 parts of polypentaerythritol of Example III having approx. 25 percent hydroxyl is heated, with stirring under $CO_2$, for two hours at 250–260° C. After cooling to 230° C. and addition of 33.8 parts phthalic anhydride, heating at 230° C. is continued for five hours. The produced oil has a viscosity of 6.3 poises and an acid number of 8.8.

Example XIV

An oil with somewhat lower phthalic contents is prepared in a similar manner from 370 parts linseed oil, 100 parts polypentaerythritol of Example II and 26.7 parts phthalic anhydride. The product has a viscosity of 17.6 poises and an acid number of 10.7. This oil is an excellent vehicle for letter press printing inks.

Example XV

A mixture of 525 parts dehydrated castor oil fatty acids and 100 parts polymerized pentaerythritol of Example I is heated, with stirring under $CO_2$, for two hours at 250–260° C. After cooling to 230° C. and addition of 29.6 parts phthalic anhydride, the reaction mixture is kept at 230° C. for 10 hours. The resultant oil has a viscosity of 20 poises.

Example XVI

A similar alkyd oil, prepared from 458 parts dehydrated castor oil fatty acids, 100 parts polypentaerythritol having 38 percent reactive hydroxyl, and 41 parts phthalic anyhdride has a viscosity of 72 poises and an acid number of 9.8.

Example XVII

A product, prepared from 490 parts linseed oil fatty acids, 100 parts purified polypentaerythritol having a molecular weight of 372 and a hydroxyl percentage of 36.6, and 30 parts phthalic anhydride, consists of an oil which has a viscosity of 8 poises and an acid number of 9.3.

Example XVIII 389 parts linseed oil fatty acids and 100 parts of a crude, approximately 1:1 mixture of di- and tri-pentaerythritol are heated for two hours in the usual manner. After addition of 34 parts adipic acid, heating at 230° C. is continued for three and a half hours. The resultant oil has a viscosity of 17 poises and an acid number of 8.5.

Example XIX 500 parts linseed oil fatty acids and 100 parts of a crude, approx. 1:1 mixture of di- and tri-pentaerythritol are heated for two hours at 250–260° C.; after addition of 16 parts maleic acid, heating at 230° C. is continued for five hours. The product has a viscosity of 17 poises and an acid number of 9.1.

To illustrate the utility of these new drying oils in only one of the many possible applications, a comparison is given, in the following tabulation, of printing inks made from several of these new oils and from a number of older products which are widely used in the printing trade. Every sample is composed of 80 percent of a specific vehicle (all having X–Y Gardner viscosity) and 20 percent carbon black. The samples have three percent cobalt drier added just prior to the printing.

| Vehicle | Drying time of print at 78° F. and 40% relat. humidity |
|---|---|
| Linseed oil | 16–17 hrs. |
| Kellin oil (Spencer Kellogg & Sons, Inc.) | 14–15 hrs. |
| Esskol (Spencer Kellogg & Sons, Inc.) | 13–14 hrs. |
| Oil of Example IX | 12–13 hrs. |
| Oil of Example XII | 10–11 hrs. |
| Oil of Example XIV | 8–9 hrs. |
| Oil of Example XIX | 7–8 hrs. |
| Oil of Example XI | 4–5 hrs. |

In using, according to the present disclosure, polyhydroxy alcohols of increased functionality in the making of this type of esterification products, it is possible to adjust the ratio between polybasic acid and drying oil fatty acids practically at will and regulate their viscosity within extensive limits. These oils have all the film characteristics, usually associated with drying alkyds, and are superior for many uses, since the need for solvents is eliminated in some instances, while in others the customary "prebodying," i. e. extended heating to obtain a higher viscosity through polymerization of the fatty acid radicals becomes superfluous.

The absence of solvents, which tend to evaporate under the brush, makes these oils especially desirable as vehicles for architectural enamels, because no drag or streakiness is encountered in painting.

It is obvious that in our preparation the so called "drying oil" fatty acids can be replaced, partly, or in whole, by fatty acids from other sources, such as may contain a preponderance of linoleic over linolenic acid, or oleic acid, and others.

Since other changes may be made in carrying out the above processes without departing from the scope of the invention, it is intended that all matter contained in the description shall be interpreted as illustrative and not in a limiting sense.

We claim:

1. An alkyd oil having a viscosity of 6.3 poises at 25° C. and an acid number of 8.8, formed by heating and stirring in an inert atmosphere without the aid of transesterification catalyst: 100 parts by weight of polymerized pentaerythritol having in the average 25 per cent reactive hydroxyl, first at 250° to 260° C. with 384 parts by weight of linseed oil fatty acids, and then at 230° C. with 33.8 parts by weight of phthalic anhydride.

2. An alkyd oil having a viscosity of 7 poises at 25° C. and an acid number of 9.3, formed by heating and stirring in an inert atmosphere without the aid of a transesterification catalyst: 100 parts by weight of polymerized pentaerythritol having in the average 33 per cent reactive hydroxyl, first for two hours at 250° to 260° C. with 483 parts by weight of soya bean fatty acids, and then for about five hours at 230° C. with 22.4 parts by weight phthalic anhydride.

3. An alkyd oil having a viscosity of 123 poises at 25° C. and an acid number of 15.5, formed by heating and stirring in an inert atmosphere without the aid of a transesterification catalyst: 100 parts by weight of polymerized pentaerythritol having in the average 31 per cent reactive hydroxyl, first for two hours at 250° C. with 365 parts by weight of dehydrated castor oil fatty acids, then for two hours at 230° C. with 40.5 parts by weight of phthalic anhydride, and filtering the product.

4. An alkyd oil having a viscosity of less than 125 poises at 25° C. and an acid number of not more than 15.5, formed by esterifying in an inert atmosphere without the aid of a transesterification catalyst: 100 parts by weight of polymerized pentaerythritol having in the average not more than 38 per cent and not less than 25 per cent reactive hydroxyl, first with 350 to 525 parts by weight of drying oil acids and then with 15 to 50 parts by weight of a polycarboxylic acid, the number of hydroxyl groups before reaction being substantially equal to the number of carboxyl groups.

PETER KASS.
ZENO W. WICKS.

REFERENCES CITED

The following references are of record in the file of this patent:

UNITED STATES PATENTS

| Number | Name | Date |
|---|---|---|
| 2,345,528 | Bradley | Mar. 28, 1944 |
| 2,360,393 | Burrell | Oct. 17, 1944 |
| 2,360,394 | Burrell | Oct. 17, 1944 |
| 2,462,046 | Wyler | Feb. 15, 1949 |